(No Model.)
J. E. BRUNKER & P. W. MAXWELL.
INHALER.
No. 405,692. Patented June 25, 1889.
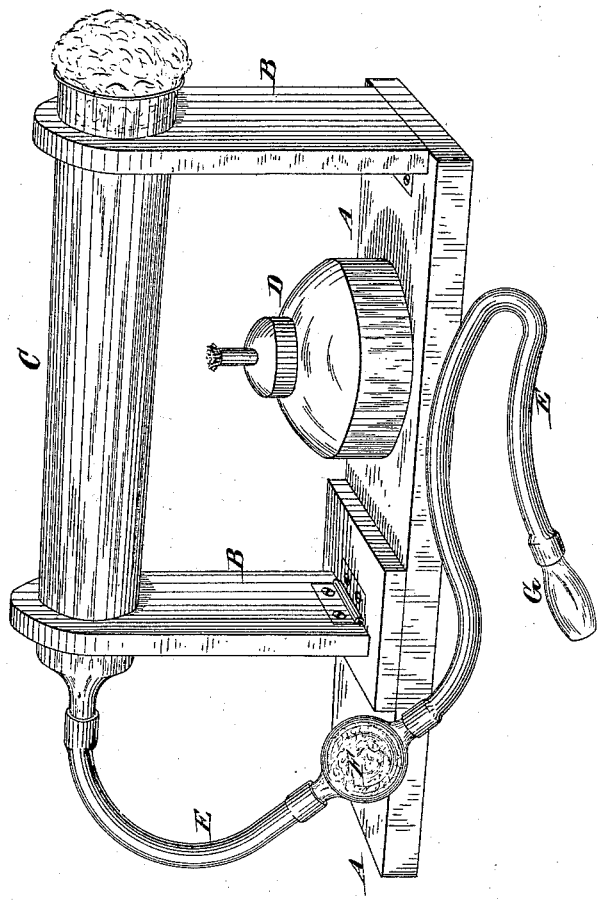
Witnesses:
Charles R. Searle,
H. D. Searle.
Inventors:
James Edward Brunker
Patrick William Maxwell
by their attorney
Thomas Drew Stetson

UNITED STATES PATENT OFFICE.

JAMES EDWARD BRUNKER AND PATRICK WILLIAM MAXWELL, OF DUBLIN, IRELAND.

INHALER.

SPECIFICATION forming part of Letters Patent No. 405,692, dated June 25, 1889.

Application filed December 6, 1888. Serial No. 292,807. (No model.) Patented in England July 30, 1888, No. 10,977.

*To all whom it may concern:*

Be it known that we, JAMES EDWARD BRUNKER, pharmaceutical chemist, and PATRICK WILLIAM MAXWELL, medical doctor, both of Dublin, Ireland, citizens of the United Kingdom of Great Britain and Ireland, have invented a certain new or Improved Chloride-of-Ammonium Inhaler for Medical Purposes, (patented in Great Britain July 30, 1888, No. 10,977;) and we do hereby declare that the following is a full, clear, and exact description of the invention, which will enable others skilled in the art to which it appertains to make and use the same.

Our invention consists of an improved apparatus whereby the fumes of chloride of ammonium may be inhaled direct from the salts, the methods and apparatus hitherto in use for this purpose admitting only of the production of such fumes by the reaction of hydrochloric acid and ammonia-gases from solutions of same.

The invention consists of a glass tube arranged in a suitably-constructed wooden stand, into which crystallized ammonium chloride is introduced, which by means of a lighted spirit-lamp is volatilized, and the fumes given off are inhaled through a suitable india-rubber tube and mouth-piece.

In order that the said invention may be more readily understood, we will describe the accompanying drawing, which is a side elevation of the entire device.

A is a bed-plate, of wood or other suitable material, on which are hinged the standards B B, so that they may be turned down for portable convenience. Through apertures in these standards is passed the horizontal glass tube or retort C, underneath which, midway between the standards, is placed the spirit-lamp D. The end of the glass tube to the right is full open, while the opposite end is provided with a conical opening to enable the flexible india-rubber tube E to be readily attached thereto. This tube is interrupted by a glass bulb F, containing fine glass wool, sometimes termed "mineral wool," for the purpose hereinafter described, and is provided at its free end with a mouth-piece G.

The action of our invention may be thus briefly described. When it is desired to use the apparatus for the purpose for which it is designed, a little water is introduced to wet the mineral wool, and a quantity, consisting of about ten or fifteen grains of crystallized ammonium chloride, is introduced into the tube C and deposited immediately over the spirit-lamp. The open end of the tube is then lightly packed with a little cotton wool, and heat being now applied by means of the lamp the salt is volatilized and the fumes given off are inhaled direct through the flexible tube E. The fine glass wool in the bulb F being moistened with water moderates the temperature of the fumes in passing from the glass tube to the mouth-piece. The fumes are medicated by dropping phenol, eucalyptol, or any essential oil or other desired medicament upon the cotton wool at open end of glass tube.

Having now particularly described and ascertained the nature of our said invention and the manner in which the same may be applied in practice, we declare that what we claim is—

1. In an inhaler, the bed A, folding support or standard B, lamp D, and retort C, in combination with each other and with the flexible tube E, as herein specified.

2. In an inhaler, in combination with a heating-lamp D and an inhaling-tube E, the retort C, with its open end partially closed by a porous stopper and adapted to receive medicaments to be volatilized in its interior, and to allow the induction of air through the end to be inhaled through the retort, as herein specified.

3. In an inhaler, the retort C and proper supports therefor, in combination with heating means D, flexible tube E, removable porous plug or loose cotton wool for inducting air gradually without circulation thereof, and porous filled bulb F, arranged to serve substantially as herein specified.

Dated this 20th day of November, 1888.

JAMES EDWARD BRUNKER.
PATRICK WILLIAM MAXWELL.

Witnesses:
J. L. MCCASKILL,
   *U. S. Consul.*
ANGELO FAHIE, *C. E.*,
   *9 Westland Row, Dublin.*